United States Patent
Padala et al.

(10) Patent No.: US 11,757,742 B2
(45) Date of Patent: Sep. 12, 2023

(54) SYSTEM AND METHOD TO DISTRIBUTE TRAFFIC FLOWS AMONG A PLURALITY OF APPLICATIONS IN A DATA CENTER SYSTEM

(71) Applicant: Telefonaktiebolaget LM Ericsson (publ), Stockholm (SE)

(72) Inventors: Chakri Padala, Bangalore (IN); Prasanna Huddar, Bangalore (IN); Amir Roozbeh, Stockholm (SE); Ahsan Javed Awan, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/753,177

(22) PCT Filed: Aug. 23, 2019

(86) PCT No.: PCT/SE2019/050776
§ 371 (c)(1),
(2) Date: Feb. 22, 2022

(87) PCT Pub. No.: WO2021/040581
PCT Pub. Date: Mar. 4, 2021

(65) Prior Publication Data
US 2022/0278911 A1   Sep. 1, 2022

(51) Int. Cl.
*G06F 15/16*    (2006.01)
*H04L 43/062*   (2022.01)
(Continued)

(52) U.S. Cl.
CPC .......... *H04L 43/062* (2013.01); *H04L 41/142* (2013.01); *H04L 43/0882* (2013.01); *H04L 45/38* (2013.01)

(58) Field of Classification Search
CPC . H04L 43/062; H04L 41/142; H04L 43/0882; H04L 45/38; H04L 41/0895;
(Continued)

(56) References Cited

U.S. PATENT DOCUMENTS 11,159,389 B1 * 10/2021 Miriyala ................ H04L 41/22
2015/0146523 A1   5/2015 Yang et al.
(Continued)

FOREIGN PATENT DOCUMENTS

WO        2015173759 A1   11/2015

OTHER PUBLICATIONS

Roozbeh et al., "Software-Defined "Hardware" Infrastructures: A Survey on Enabling Technologies and Open Research Directions," 2018, pp. 2454-2485, IEEE Communications Surveys & Tutorials, vol. 20, No. 3, Third Quarter.
(Continued)

*Primary Examiner* — Karen C Tang
(74) *Attorney, Agent, or Firm* — Nicholson De Vos Webster & Elliott LLP

(57) ABSTRACT

A system and method to distribute traffic flows among a plurality of applications in a data center system. An apparatus is operable with a plurality of applications connected through a programmable switch and is configured to select traffic flows to ones of the plurality of applications. The apparatus is also configured to monitor and collect statistics for the traffic flows to determine rule level statistics, and move at least one traffic flow of the traffic flows from a network interface to a different network interface based on the rule level statistics.

19 Claims, 5 Drawing Sheets

(51) Int. Cl.
*H04L 41/142* (2022.01)
*H04L 43/0882* (2022.01)
*H04L 45/00* (2022.01)

(58) Field of Classification Search
CPC ......... H04L 41/40; H04L 43/20; H04L 45/74; H04L 49/70; H04L 43/026; H04L 43/04; H04L 41/083
USPC .......................................................... 709/224
See application file for complete search history.

(56) References Cited

U.S. PATENT DOCUMENTS

| | | | |
|---|---|---|---|
| 2015/0172102 A1* | 6/2015 | DeCusatis | H04L 43/0876 370/218 |
| 2016/0191361 A1* | 6/2016 | Behera | H04L 43/20 709/224 |
| 2018/0097728 A1* | 4/2018 | Bodi Reddy | H04L 49/70 |
| 2018/0109471 A1* | 4/2018 | Chang | H04L 49/70 |
| 2018/0331905 A1* | 11/2018 | Toledo | H04L 43/0882 |

OTHER PUBLICATIONS

International Search Report and Written Opinion for Application No. PCT/SE2019/050776, dated Apr. 8, 2020, 11 pages.

* cited by examiner

SYSTEM AND METHOD TO DISTRIBUTE TRAFFIC FLOWS AMONG A PLURALITY OF APPLICATIONS IN A DATA CENTER SYSTEM

CROSS-REFERENCE TO RELATED APPLICATIONS

This application is a National stage of International Application No. PCT/SE2019/050776, filed Aug. 23, 2019, which is hereby incorporated by reference.

TECHNICAL FIELD

The present disclosure is directed, in general, to the field of data center systems and, more particularly, to a system and method to distribute traffic flows among a plurality of applications in a data center system.

BACKGROUND

In a data center system such as a cloud-based data center ("DC") environment, a server can contain different services running in different applications (e.g., in virtual machines ("VMs") and in containers). The containers can be described as operating systems with a partitioned structure configured to isolate portions of its execution, thereby creating a "jail" or "sandbox," generally for security purposes or to isolate operational errors.

A server can receive different network traffic patterns. Typically, a programmable switch is used to switch incoming network traffic into these different VMs/containers based on the incoming packet. A network manager such as a software-defined network ("SDN") controller configures such a programmable switch with different rules to distinguish traffic patterns or flows from each other and to send the incoming packets to appropriate entities.

The programmable switch such as a virtual switch (e.g., an Open V-Switch ("OVS")) contains rules (which are based on flow information) for multiple VMs and containers. The rules are typically ordered by a priority. There can be an exact match cache process based on full packet headers, which is based on a hash table lookup. In the exact match cache, the incoming packet header fields are used to create a hash key. The hash lookup returns packet flow header(s) on a successful lookup. An exact comparison of the incoming packet headers with the packet headers from the results is done. Whenever a new packet arrives, it is first examined in the exact match cache. If there is no match, then rules are looked up. The problem is that there could be VMs or containers with little traffic but high priority rules. These rules will also be matched. These rules can specify either exact packet header values or can contain wildcard rules. Thus matching the rules employs more computation which can add to latency/jitter.

Some rules are used for services that have a significant amount of incoming traffic, while other rules may be matched by few incoming packets. The rule matching patterns could also change over time such as during a day. As each rule processing takes some time, the latency incurred by each packet will increase with number of the rules that the packet has to be matched against. This is further exacerbated by current hardware trends where central processing unit ("CPU") speeds are stagnating, but the number of processing cores is increasing, causing more workloads to be deployed in the same server machine. This leads to an increase in the number of rules without much improvement in speed for processing of a single rule.

A workload with little traffic may have a significant number of rules with high priority (i.e., rules that at the top of a list) and may require all the packets to match these high priority rules. It is also possible that a good portion of the top rules are used by inactive/low traffic workloads. This could also introduce delays for packets going to workloads with high traffic.

While virtual machine workload migration could be thought of as a solution, current network managers do not have the intelligence for adequate placement of these virtual machines as the problem could be reintroduced on the migrated server. It also does not address the problem for diurnal/time-based traffic patterns. It is known that virtual machine migration is a resource-laden process.

As a result, the presence of a lot of inactive rules can lead to slow lookups for active virtual machines. As application access patterns change, the active/inactive rules change over time including based on the time of day. There is no current mechanism to provide fast lookups with reduced latency for active applications including virtual machines. A process that addresses these issues can enhance the efficiency with which resources are allocated and consumed in the environment of applications such as virtual machines and containers, which is a highly desirable result.

SUMMARY

These and other problems are generally solved or circumvented, and technical advantages are generally achieved, by advantageous embodiments of the present disclosure for a system and method to distribute traffic flows among a plurality of applications in a data center system. In one embodiment, an apparatus is operable with a plurality of applications connected through a programmable switch and is configured to select traffic flows to ones of the plurality of applications. The apparatus is also configured to monitor and collect statistics for the traffic flows to determine rule level statistics, and move at least one traffic flow of the traffic flows from a network interface to a different network interface based on the rule level statistics.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, reference is now made to the following descriptions taken in conjunction with the accompanying drawings, in which.

Corresponding numerals and symbols in the different figures generally refer to corresponding parts unless otherwise indicated, and may not be described again in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with a system and method to distribute traffic flows among a plurality of applications in a data center system.

A system will be described herein with respect to exemplary embodiments in a specific context, namely, a programmable switch that is connected to a network interface such as a network interface card ("NIC"), that captures rule statistics and allocates the rules to the NIC/virtual function, thereby producing faster lookups for active applications. While the principles will be described in the environment of a network interface card coupled to a virtual function, any application employing virtual machines, containers, and/or other virtual functions that may benefit from such a system and method that enables these functionalities is well within the broad scope of the present disclosure. The process introduced herein automates identification and migration of workloads with high priority rules and low traffic volume and can avoid the overhead of moving a workload to a different server.

Figure 1:
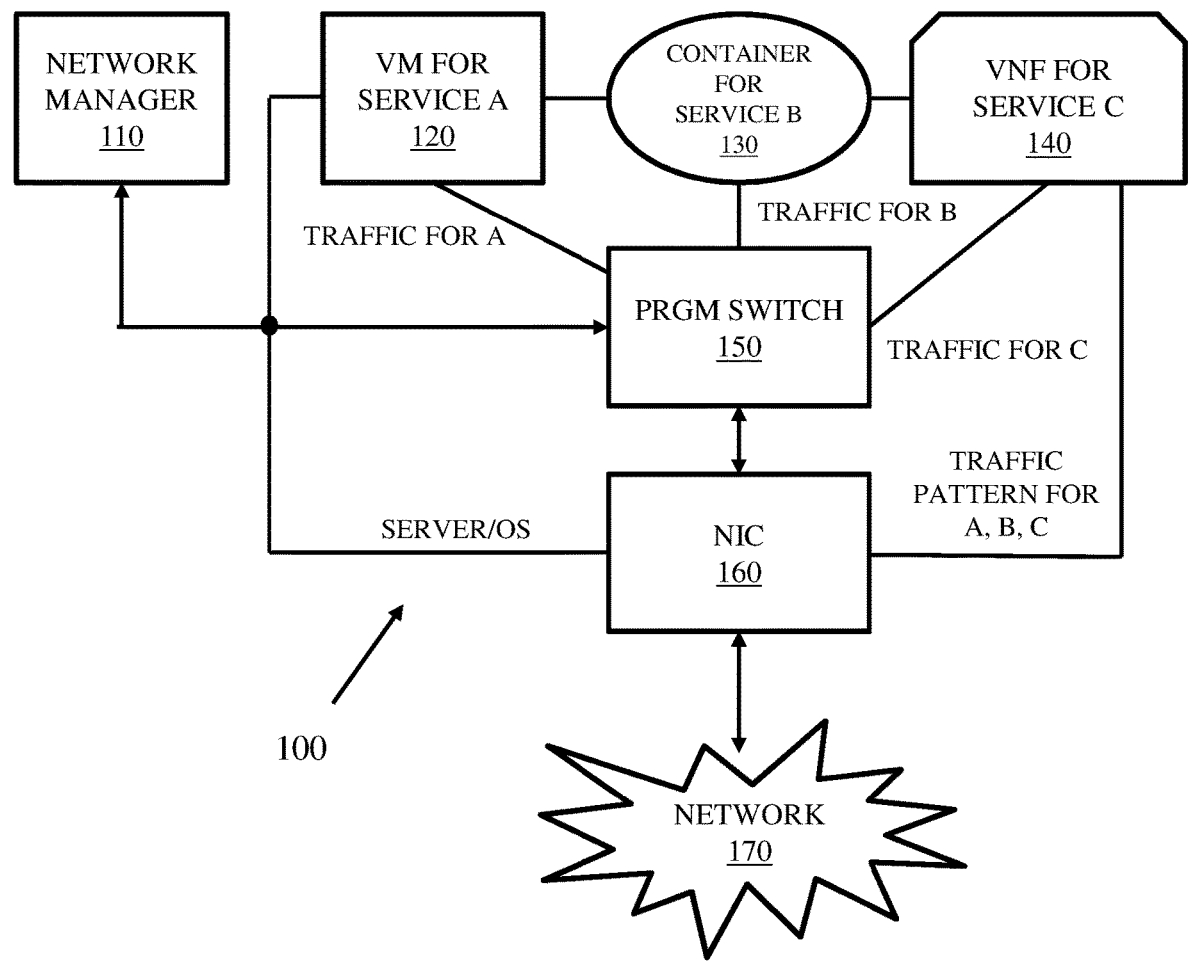
FIG. 1 illustrates a block diagram of an embodiment of a portion of a data center system.

Turning now to FIG. 1, illustrated is a block diagram of an embodiment of a portion of a data center system 100. The data center system 100 includes a network manager 110 such as an SDN controller coupled to a virtual machine ("VM") 120 providing a service A, a container 130 providing a service B, and a virtual network function ("VNF") 140 providing a service C. Traffic patterns for the respective services are indicated as "Traffic" in FIG. 1. Collectively, the elements illustrated in FIG. 1 are coupled to a programmable switch ("PRGM Switch") 150 such as a virtual switch (V-switch) that in turn is coupled to a network interface 160 such as network interface card ("NIC") and to a network 170.

The network manager 110 configures the programmable switch 150 (e.g., a software switch) with different rules to distinguish traffic patterns from each other and to send packets to appropriate entities. The rules have priorities so that more specific rules are processed before generic rules. Some parts of the rules can have wildcards or masks. For example, a hypertext transfer protocol ("HTTP") server can have a single rule that describes packets coming to, for instance, a port 80 and a server Internet Protocol ("IP") address 20.0.0.1 from any source or from a specified sub-network. The rules are checked in order for each incoming packet. It is noted that each rule takes some time to process, so an increase in the number of rules to be checked results in higher packet latency.

The programmable switch 150 sometimes can employ an exact match cache ("EMC"), a limited entry hash table with recently arrived packet traffic flows, used to speed up packet processing. When a new packet arrives, a hash is created with the packet header fields and is examined for an exact match cache. If there is a cache hit, then the individual packet fields are compared and the necessary transformation is applied to the packet (for example, to remove a virtual local area network ("VLAN") header) and is sent to an appropriate application such as a virtual machine/container. If there is no match, packets are processed using the usual rules.

It is noteworthy to set forth two characteristics of an exact match cache. An exact match cache is limited in size and the entries are timed out after some time. Two different packet traffic flows can use two entries in an exact match cache, even though the same rule is applicable to both of them. The following example clarifies this.

An exact match with the above example rule will contain a packet coming from IP 10.1.1.20 port 40001 to IP 20.1.1.1 port 80. Another exact match may match packets coming from IP 10.1.1.20 port 40002 to IP 20.1.1.1 port 80, both resulting from the rule above. Using the above example, when a new packet arrives coming from IP 10.1.1.20 port 40003 to IP 20.1.1.1 port 80, the exact match cache will not have an entry and the packet will be sent to the rules processing thread, typically called a poll mode driver ("PMD") thread. One example of this can be realized by a thread in a data plane development kit ("DPDK") augmented programmable switch. Of course, other processing modes exist serving similar functionality as PMD and DPDK. The rule processing thread evaluates each packet in a serial manner, matching each rule with the incoming packet headers. When a rule matches the incoming packet, a new exact cache entry is created (removing an aged rule if necessary).

A programmable switch such as a virtual switch can pull statistics for a VNF (a virtual network function such as a VM/container) for the first N traffic flow rules. For the rules to be monitored, a special flag is added by the virtual switch. A database maintains the traffic flows that need to be monitored. A process keeps updating statistics for only flagged traffic flows and when traffic flows toward a VM are identified.

The VM/container traffic flows are identified that have sporadic traffic. Rule level statistics from the virtual switch are accumulated. The statistics are collected over a period of time based on the data collected for the first N traffic flows; then the traffic flows can be aggregated on a per-VM basis.

The aggregated rule level statistics are compared with traffic on VM ports. If the aggregated traffic is not a significant amount of the VM traffic or if the VM traffic is not significant, then this VM is considered for migration.

After the detection of the virtual machines with sporadic traffic, through a network manager such as an SDN controller/cloud orchestrator, a new VF is created, or a new NIC is inserted in a disaggregated server based on the amount of traffic. The VF is reprogrammed with new traffic flows. A new virtual switch or a new PMD thread is started. The same logic can be used to move the rules back to the original switch, if a traffic change is detected.

With the introduction "disaggregated hardware architecture" for data centers, the way current "servers" are defined may change. A disaggregated hardware architecture includes several pools of hardware resources such as pools of CPUs, memories, storage nodes as well as network interface cards connecting through a very fast interconnect. This means that distinct and pre-configured servers may disappear or be less common in future data center architectures. In this architecture, "logical" servers can be created dynamically and on-demand by combining resources from a subset of available pools of resources such as hardware in the data center, or even within several geographically distinct data centers. See, e.g., A. Roozbeh et al., "Software-Defined "Hardware" Infrastructures: A Survey on Enabling Technologies and Open Research Directions," IEEE Communications Surveys & Tutorials, vol. 20, no. 3, pp. 2454-2485, which is incorporated herein by reference.

The processed information in the virtual switch can be shared with an SDN controller based on which the SDN controller can decide to enhance the rules on the other virtual switches if the migrated application is part of a service chain (based on some rules). The service chain may include a chain of virtual/physical switches and applications running in VMs/containers.

As introduced herein, inactive/low traffic receiving rules/ VMs are identified. In other words, rules associated with lower traffic. Traffic for these rules is moved to a new NIC in a disaggregated server, or disaggregating the existing NIC via the creation of a new virtual function in the existing network interface and directing the traffic through the NIC. When a new VF on the NIC (i.e., slicing a NIC) is created or a new NIC is added, a new reservoir for rules is created. This allows an elimination or at least a reduction of co-locating the rules for high traffic and low traffic. A new rule processing thread (Packet Thread with appropriate priority (such as a Low Packet Thread "LPT")) is created to process the traffic, eliminating the impact of these rules. It could be noted that instead of moving a low traffic receiving rules, VMs with higher trafficking rules could be moved with the above logic as appropriate for the case. It is also conceivable that instead of running a new thread, multiple V switches can be run.

Thus, less-used rules are captured and moved to a new NIC/virtual function creating much faster lookups for traffic of active VMs which receives most of traffic. Time consuming and resource-laden VM migration is thereby avoided. The solution is scalable as the number of cores in central processing units ("CPUs") continues to increase. This leads to energy efficiency as high traffic workloads encounter fewer rules. By reducing the number of rules high traffic workloads encounter, we are reducing the amount of per packet processing. This could lead to less energy per packet and/or higher throughput. By processing fewer rules, the execution time of traffic flow distribution can be reduced, thereby improving the energy efficiency.

Figure 2:
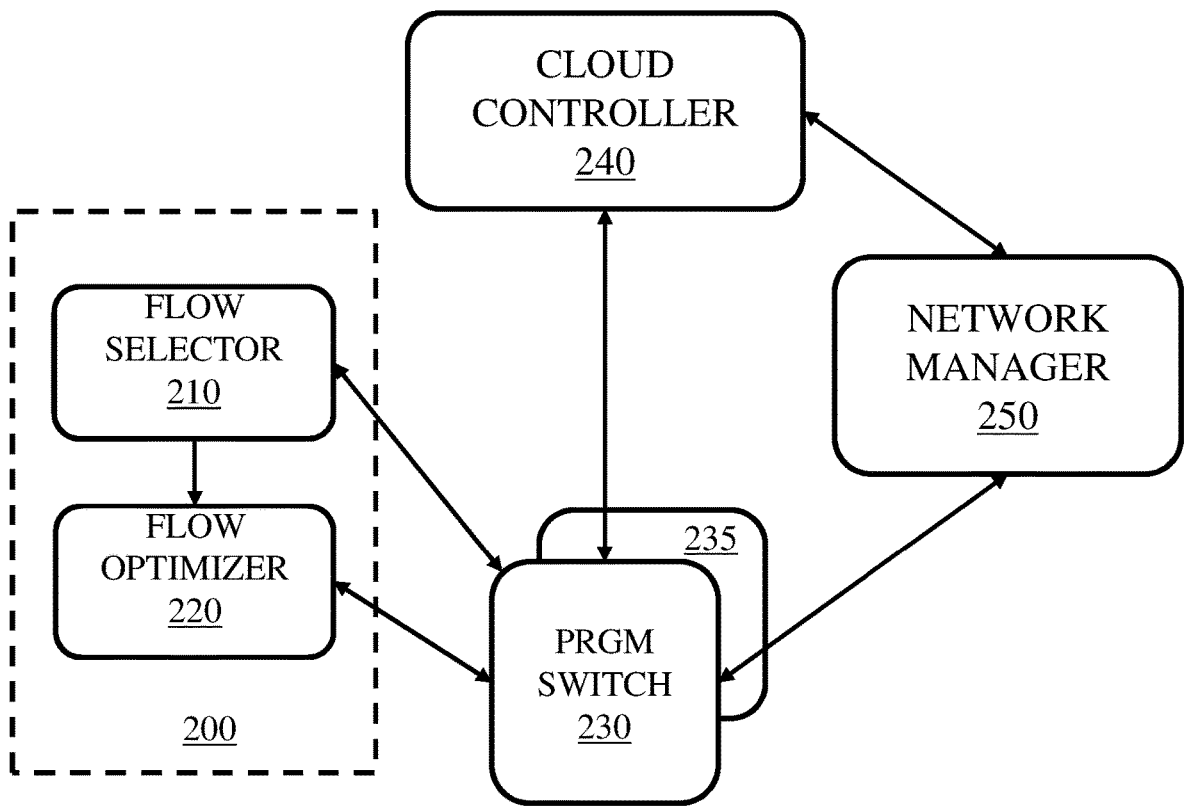
FIG. 2 illustrates a block diagram of an embodiment of an apparatus operable in a server of a data center system.

Turning now to FIG. 2, illustrated is a block diagram of an embodiment of an apparatus 200 operable in a server of a data center system. The apparatus 200 includes a flow selector 210 and a flow optimizer 220 in communication with a programmable switch 230 such as an open virtual switch ("OVS"), a cloud controller 240 and a network manager 250 such as an SDN controller. For purposes of illustration, another programmable switch 235 is illustrated to demonstrate that the server may incorporate any number of switches (and other components as well).

The flow selector 210 selects different traffic flows to be monitored. The action of monitoring can be done by V switch or any other component in the system. The flow selector 210 registers for programmable switch traffic flows added/deleted events. Multiple traffic flows are grouped together with priority for monitoring. In accordance therewith, the flow selector 210 can select the first N traffic flows, where N is subset of available flows on the switch, to be monitored and provides them to the flow optimizer 220. The flow selector 210 updates the flow optimizer 220 based on the registered events.

The flow optimizer 220 can run independently in, for instance, another programmable switch 235 such as in an open-flow ("OF") switch as a component, or as a standalone entity communicating therewith. The flow optimizer 220 can be used to monitor a number N of traffic flows. The programmable switch(es) 230, 235 can store rule level statistics for each of the traffic flows.

The flow optimizer 220 monitors and collects statistics for the given group of traffic flows for every X ticks from EMC and normal open flow pipeline. The data collected is processed and stored. Since the programmable switch(es) 235 stores rule level statistics per traffic flow in a cumulative fashion, the flow optimizer 220 processes the data and stores the exact traffic flow between two monitoring cycles with a time stamp in a time series fashion. For example, if statistics collected at a time T is 100 and statistics collected at a time "T+X" is 110, then the traffic flow between "T" and "T+X" would be 110−100=10 (which is stored with a T+X time-stamp).

Based on the processed rule level statistics, the traffic flows are classified by the flow optimizer 220 into different bands. If a particular traffic flow or traffic flows stays in a lower band over a period of time, then the cloud controller 240 and network manager 250 are informed. The cloud controller 240 creates a new virtual function on NIC (e.g., NIC slicing) or a new (physical) card is inserted in a disaggregated server based on an amount of traffic.

A new packet thread with appropriate priority (such as a Low Packet Thread ("LPT")) is created to process the identified rules and the associated traffic flow(s) are moved to the new thread. The flow optimizer 220 is also used to monitor the LPTs and move them back to normal traffic flow when the traffic flow moves to a higher band. Thus, the flow optimizer 220 monitors the selected traffic flows for rule level statistics every X ticks, correlates, and then, based on processed data, moves low traffic flows to new or existing LPT thread(s).

The network manager 250 is aware of the rule level statistics and can check other service chains and initiate similar actions. It is assumed that the network manager 250 is managing a service chain which has three services running as services A, B and C. The service chain is a sequence of applications through which the "traffic flows" go through. The applications themselves are deployed in different containers or virtual machines, etc. They can be running on the same host or different hosts, which means that all the traffic rules can be in one programmable switch or in programmable switches 230, 235.

The flow optimizer 220 monitors N traffic flows towards services running in virtual machines. The flow optimizer 220 monitors and moves the traffic flows to a new LPT thread based on the above process. The flow optimizer 220 can inform the network manager 250 about the traffic flows belong to service A being moved to the new LPT thread due to low traffic. Based on the information, the network manager 250 can augment and inform the flow optimizer to check the traffic flows towards other services B and C, and apply a similar action on the traffic flows as needed. By doing so, the whole service chain traffic flows can be augmented. The network manager 250 programs the traffic flows on the programmable switch 230 based on the virtual machine spawned. Thus, the apparatus automates identification/migration of workloads with high priority rules and low traffic volume and avoids the overhead of moving a workload to a different server.

Figure 3:
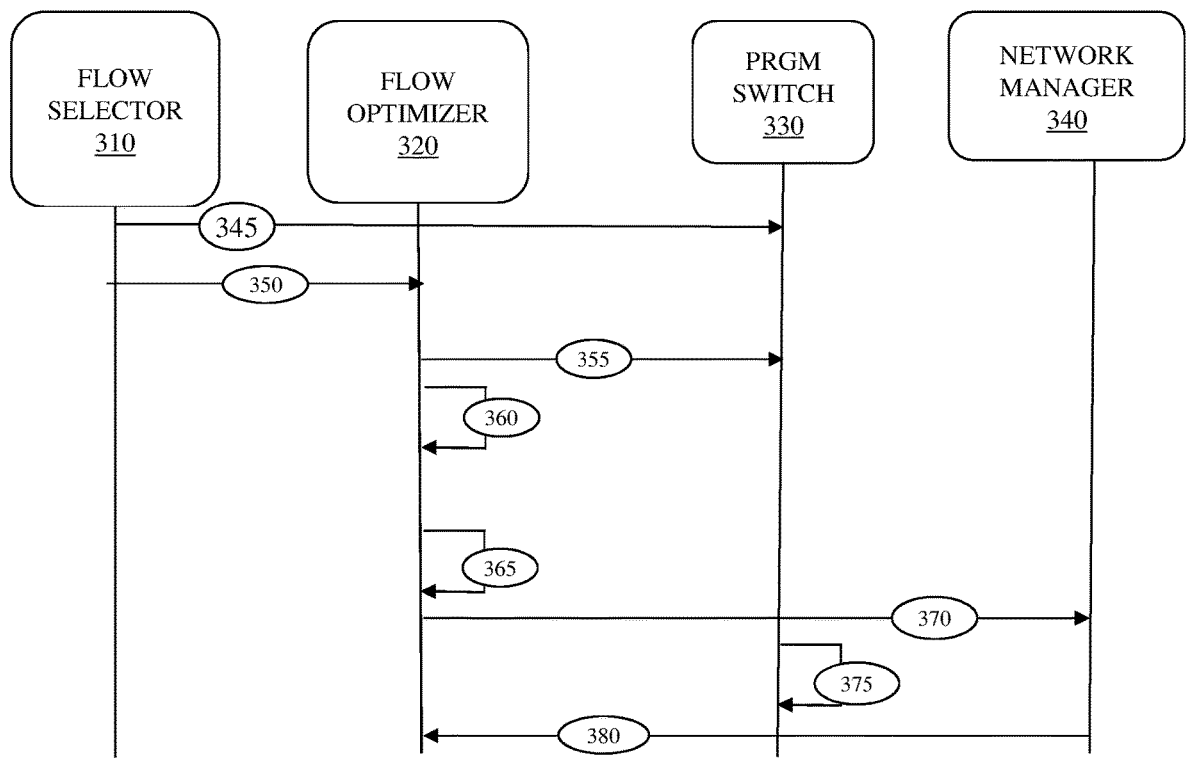
FIG. 3 illustrates a signaling diagram of an embodiment of a method of operating an apparatus operable in a server of a data center system.

Turning now to FIG. 3, illustrated is a signaling diagram of an embodiment of a method of operating an apparatus operable in a server of a data center system. The apparatus includes a flow selector 310 and a flow optimizer 320 in communication with a programmable switch 330 such as an open virtual switch 330 and a network manager 340 such as an SDN controller.

The flow selector 310 is configured to select and configure automatically the traffic flows to be monitored. In a step 345, the flow selector 310 registers for programmable switch 330 traffic flow added/deleted events. In a step 350, the flow selector 310 groups multiple traffic flows together with a priority for monitoring.

In a step 355, the flow optimizer 320 monitors and collects rule level statistics for a given group of traffic flows for every X ticks from EMC and normal open flow pipeline. In a step 360, the flow optimizer 320 processes the collected data and stores the processed data. Since the programmable switch 330 switch stores rule level statistics per traffic flow in a cumulative fashion, the flow optimizer 320 processes the data and stores the exact traffic flow between two monitoring cycles with a timestamp in a time-series fashion. In a step 365, based on the processed rule level statistics, the flow optimizer 320 classifies traffic flows into different bands.

If the particular traffic flow/traffic flows stays in the lower band over a period of time, then in a process 370 the flow optimizer 320 informs the network manager 340. The network manager 340 either independently or in conjunction with a cloud controller creates a new VF on current network interface 160 or add a new card to the data center system 100 (see FIG. 1) based on the amount of traffic. In a step 375, the programmable switch 330 creates a new LPT thread in response to the rule movement from the flow optimizer that moves the traffic flow/traffic flows to the thread. Also, the flow optimizer 320 is used to monitor the LPT threads and move them back to normal traffic flow when the traffic flow moves to a higher band.

Assume the network manager 340 is managing a service chain, which has three services running as A, B, and C. The flow optimizer 320 monitors N traffic flows towards service A running in VM A. The flow optimizer 320 monitors and moves the traffic flows to a new LTP thread based on the above algorithm. The flow optimizer 320 can inform the network manager 340 about the flows being moved to LTP thread due to low traffic. Based on this information, the network manager 340 can enhance/check the flows towards other services B and C, and apply a similar action on flows as needed. By doing so, the whole service chain flows can be enhanced. In a process 380, the network manager 340 initiates flow optimization on other services such as services B and C by informing the flow optimizers 320.

Figure 4:
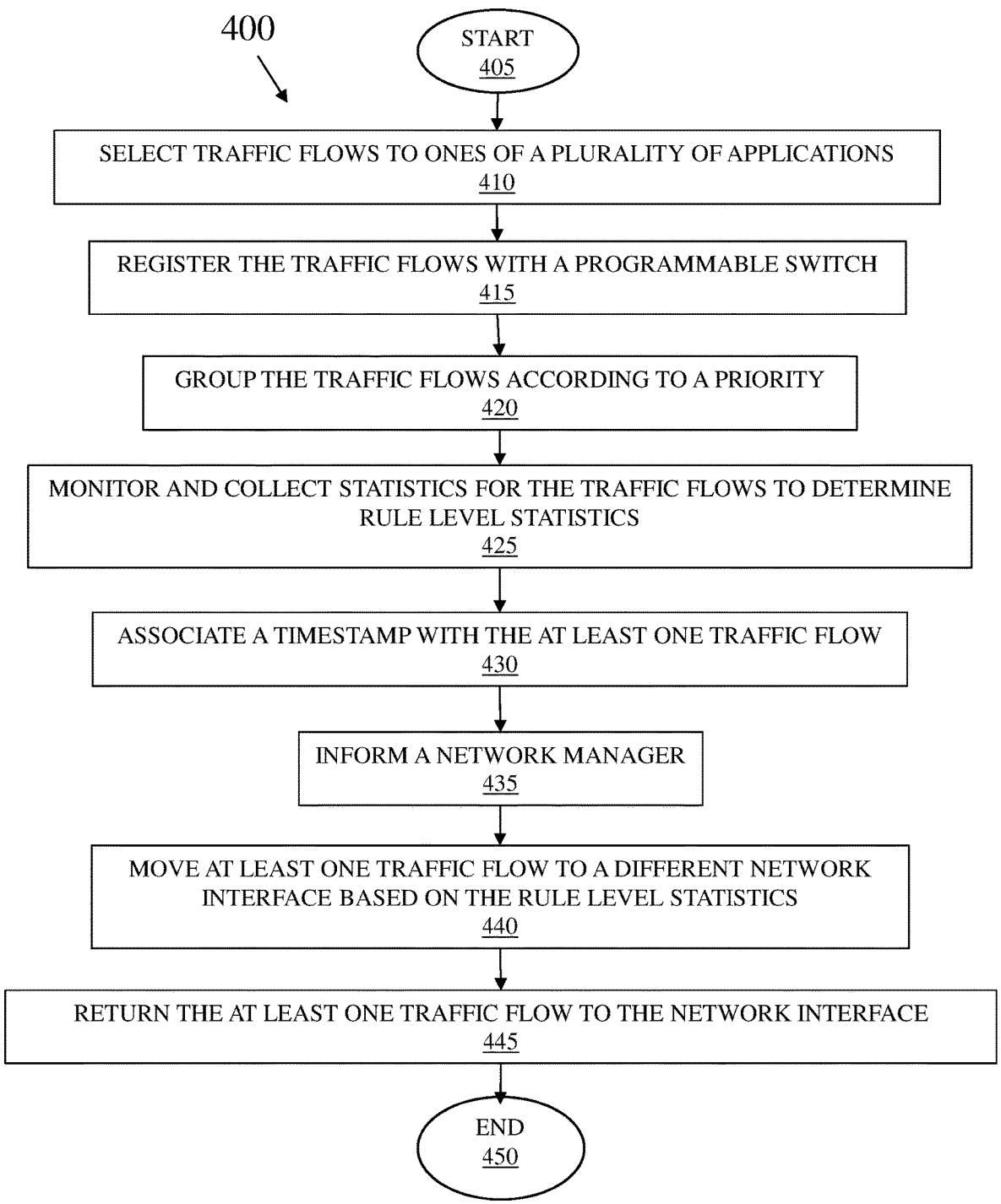
FIG. 4 illustrates a flow diagram of an embodiment of a method of controlling traffic flow among a plurality of applications in a data center system.

Turning now to FIG. 4, illustrated is a flow diagram of an embodiment of a method 400 of controlling traffic flow among a plurality of applications in a data center system. The method 400 is operable in an apparatus (e.g., apparatus 200 of FIG. 2) of a node (e.g., a server 500 of FIG. 5) of a data center system (e.g., including a cloud-based data center) with a plurality of applications (120, 130, 140) connected through a programmable switch (230) such as an open virtual switch. The plurality of applications (120, 130, 140) may include a virtual machine, a container and a microservice.

The method 400 begins at a start step or module 405. At a step or module 410, the apparatus (200) selects traffic flows to ones of the plurality of applications (120, 130, 140). At a step or module 415, the apparatus (200) registers the traffic flows with the programmable switch (230). At a step or module 420, the apparatus (200) groups the traffic flows according to a priority. At a step or module 425, the apparatus (200) monitors and collects statistics for the traffic flows to determine rule level statistics. The rule level statistics may include rules like "packets matching src=< >, dest=< > send to interface <foo>". When the rule is matched a counter(s) may be incremented. For example, 1) number of packets matching this rule 2) number of bytes of packets that matched this rule.

The rule refers to a matching criteria selected by a network manager based on the service and the type traffic. For the selected flow by the flow selector, aggregated statistics are collected. The aggregated statics are only collected for the selected N rules/flows. Therefore, rule level statistics describe the statistics associated to each rule (e.g., what is its priority and how often it gets matched to one packet). Based on these statistics, different actions can be performed.

At a step or module 430, the apparatus (200) associates a timestamp with at least one traffic flow. When referring to "at least one traffic flow," it should be understood that the apparatus (200) may perform the operations disclosed herein on a traffic flow or multiple traffic flows. At a step or module 435, the apparatus (200) informs a network manager (250) such as a software-defined network controller/cloud controller of the at least one traffic flow being moved to a different network interface or a reprioritization of the at least one traffic flow to enable the network manager (250) to configure rules for the programmable switch (230) or another programmable switch (235) to control the at least one traffic flow that is, for instance, part of a traffic service chain. The cloud controller/network manager can create a new virtual function or add a new NIC to the server (in a disaggregated server). This may further involve programming other upstream switches in data center to send the traffic to the new virtual or physical switch.

At a step or module 440, the apparatus (200) moves at least one traffic flow of the traffic flows from a network interface to a different network interface based on the rule level statistics. The apparatus (200) can slice the network interface into more than one (e.g., two) virtual function or add another network interface. As a result, the at least one traffic flow may experience reduced latency/jitter or the system in general may experience energy savings. The different network interface may include a rule processing thread to control the at least one traffic flow and be a different rule processing thread from which the at least one traffic flow previously resided.

The apparatus (200) may move the at least one traffic flow in response to a change in traffic rule matching statistics. The apparatus (200) may move the at least one traffic flow in response to applying a low priority rule to move the at least one traffic flow when the at least one traffic flow is high. The apparatus (200) may move the at least one traffic flow in response to applying a high priority rule to move the at least one traffic flow when the at least one traffic flow is low. At a step or module 445, the apparatus (200) may optionally return the at least one traffic flow to the network interface. The method 400 ends at an end step or module 450.

Figure 5:
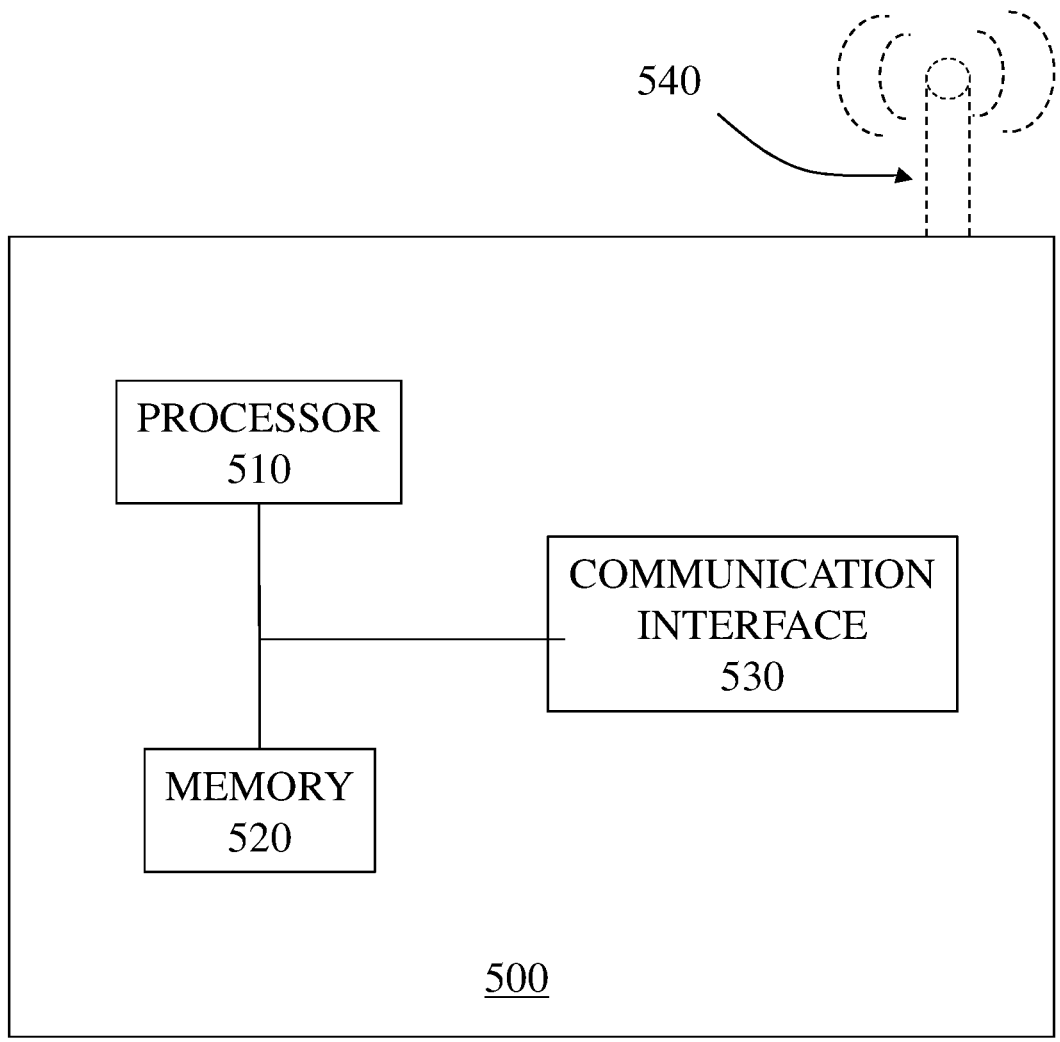
FIG. 5 illustrates a block diagram of an embodiment of a communication node in a data center system.

Turning now to FIG. 5, illustrated is a block diagram of an embodiment of a communication node 500 in a data center system. The communication node 500 may be a server configured to perform functions of allocating resources in a data center system.

The communication node 500 includes a processor (or processing circuitry) 510, a memory 520 and a communication interface 530. The communication node 500 may also include an antenna(s) 540 depending on the type of device such as a server with wireless communication capability. In particular embodiments, some or all of the functionality described herein may be provided by, without limitation, a machine type communication ("MTC") and machine-to-machine ("M2M") devices, a radio base station, a radio network controller, and a data center (e.g., computer(s) that form a data center).

The functionality of the communication node 500 may be provided by the processor 510 executing instructions stored on a computer-readable medium, such as the memory 520 shown in FIG. 5. Alternative embodiments of the communication node 500 may include additional components (such as the interfaces, devices and circuits mentioned above) beyond those shown in FIG. 5 that may be responsible for providing certain aspects of the device's functionality, including any of the functionality to support the solution described herein.

The processor 510 (or processors), which may be implemented with one or a plurality of processing devices, perform functions associated with its operation including, without limitation, performing the operations of allocating communication and data center resources, decoding of individual bits forming a communication message, formatting of information and overall control of a respective communication node 500. Exemplary functions related to management of communication resources include, without limitation, hardware installation, traffic management, performance data analysis, configuration management, security, billing and the like. The processor 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processor 510 may include, without limitation, application processing circuitry. In some embodiments, the application processing circuitry may be on separate chipsets. In alternative embodiments, part or all of the application processing circuitry may be combined into one chipset, and other application circuitry may be on a separate chipset. In still alternative embodiments, part or all of the application processing circuitry may be on the same chipset, and other application processing circuitry may be on a separate chipset. In yet other alternative embodiments, part or all of the application processing circuitry may be combined in the same chipset.

The processor 510 may be configured to perform any operations described herein. The operations as performed by the processor 510 may include processing information obtained by the processor by, for example, converting the obtained information into other information, comparing the obtained information or converted information to information stored in the respective device, and/or performing one or more operations based on the obtained information or converted information, and, as a result of the processing, making a determination.

The memory 520 (or memories) may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 520 may include program instructions or computer program code that, when executed by an associated processor, enable the respective communication node 500 to perform its intended tasks. Of course, the memory 520 may form a data buffer for data transmitted to and from the same. Exemplary embodiments of the system, subsystems, and modules as described herein may be implemented, at least in part, by computer software executable by the processor 510, or by hardware, or by combinations thereof.

The communication interface 530 modulates information onto a carrier waveform for transmission by the respective communication node 500 to another communication node. The respective communication interface 530 also demodulates information received from another server for further processing. The communication interface 530 can support duplex operation for the respective server 500, and supports communication with a core network.

The antenna 540 (antennas), when applicable, may be any type of antenna capable of transmitting and receiving data and/or signals wirelessly. In some embodiments, the antenna 540 may include one or more omni-directional, sector or panel antennas operable to transmit/receive radio signals between, for example, 2 gigahertz ("GHz") and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. While the antenna 540 facilitates wireless communication for the communication node 500, the communication node 500 may also communicate via a wired communication path via the communication interface 530 and, in such instances, the antenna 540 may not be necessary. The subsystems as introduced above with respect to the preceding FIGUREs may be embodied in the communication node 500 performed by, for instance, the processor 510 in conjunction with the memory 520.

Thus, a system and method to distribute traffic flows among a plurality of applications in a data center system such as a cloud-based data center. The system and method can be performed in real-time, taking into account multiple criteria, to distribute traffic flows among a plurality of applications in a data center system.

The foregoing description of embodiments of the present proposed solution has been presented for the purpose of illustration and description. It is not intended to be exhaustive or to limit the proposed solution to the present form disclosed. Alternations, modifications and variations can be made without departing from the spirit and scope of the present proposed solution.

As described above, the exemplary embodiment provides both a method and corresponding system consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiment can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. An apparatus operable with a plurality of applications connected through a programmable switch comprising:
   processing circuitry; and
   a memory comprising instructions which, when executed by the processing circuitry, cause the apparatus to:
      select traffic flows to ones of said plurality of applications;
      monitor and collect statistics for said traffic flows to determine rule level statistics;
      move, based on said rule level statistics, at least one traffic flow of said traffic flows from a network interface to a different network interface, the different network interface comprising a new NIC or a new virtual function; and
      move, to the new NIC or the new virtual function, rules for the traffic flows, such that rules for one type of traffic flow are not co-located with rules for another type of traffic flow.

2. The apparatus as recited in claim 1, wherein said programmable switch is an open virtual switch (OVS).

3. The apparatus as recited in claim 1, wherein said plurality of applications comprises at least one of a virtual machine, a container and a microservice.

4. The apparatus as recited in claim 1, wherein said different network interface comprises a rule processing thread to control said at least one traffic flow.

5. The apparatus as recited in claim 4, wherein said rule processing thread is a different rule processing thread.

6. The apparatus as recited in claim 1, wherein is the apparatus further to group said traffic flows according to a priority.

7. The apparatus as recited in claim 1, wherein the apparatus further to associate a timestamp with said at least one traffic flow.

8. The apparatus as recited in claim 1, wherein the apparatus further to register said traffic flows with said programmable switch.

9. The apparatus as recited in claim 1, wherein the apparatus further to return said at least one traffic flow to said network interface.

10. The apparatus as recited in claim 1, wherein the apparatus further to inform a network manager of said at least one traffic flow being moved to a different network interface to enable the network manager to configure rules for said programmable switch or another programmable switch to control said at least one traffic flow.

11. The apparatus as recited in claim 10, wherein said network manager comprises a software-defined network controller.

12. The apparatus as recited in claim 1, wherein the apparatus further to inform a network manager of a reprioritization of said at least one traffic flow to enable the network manager to reconfigure rules for said programmable switch or another programmable switch to control said at least one traffic flow that is part of a traffic service chain.

13. The apparatus as recited in claim 1, wherein the apparatus further to move said at least one traffic flow in response to a change in traffic rule matching statistics.

14. The apparatus as recited in claim 1, wherein the apparatus further to apply a low priority rule to move said at least one traffic flow when said at least one traffic flow is high.

15. The apparatus as recited in claim 1, wherein the apparatus further to apply a high priority rule to move said at least one traffic flow when said at least one traffic flow is low.

16. A method operable with a plurality of applications connected through a programmable switch comprising:
   selecting traffic flows to ones of said plurality of applications;
   monitoring and collecting statistics for said traffic flows to determine rule level statistics;
   moving, based on said rule level statistics, at least one traffic flow of said traffic flows from a network interface to a different network interface, the different network interface comprising a new NIC or a new virtual function; and
   moving, to the new NIC or the new virtual function, rules for the traffic flows, such that rules for one type of traffic flow are not co-located with rules for another type of traffic flow.

17. The method as recited in claim 16, wherein said different network interface comprises a rule processing thread to control said at least one traffic flow.

18. The method as recited in claim 17, wherein said rule processing thread is a different rule processing thread.

19. The method as recited in claim 16 further comprising informing a network manager of said at least one traffic flow being moved to a different network interface to enable the network manager to configure rules for said programmable switch or another programmable switch to control said at least one traffic flow.

* * * * *